United States Patent [19]

Higuchi et al.

[11] 4,364,760
[45] Dec. 21, 1982

[54] CERAMIC HONEYCOMB FILTER

[75] Inventors: Noboru Higuchi; Teruo Yano, both of Nagoya; Masahiro Ohnishi, Kuwana, all of Japan

[73] Assignee: NGK Insulators, Ltd., Nagoya, Japan

[21] Appl. No.: 197,017

[22] Filed: Oct. 15, 1980

[30] Foreign Application Priority Data

Aug. 28, 1980 [JP] Japan ................. 55-117736

[51] Int. Cl.³ ............................................. B01D 39/20
[52] U.S. Cl. .............................. 55/523; 55/DIG. 30; 210/510; 422/180
[58] Field of Search ........................ 55/523, DIG. 30; 252/477 R; 106/40 R; 60/311; 422/180; 210/510; 428/117

[56] References Cited

U.S. PATENT DOCUMENTS

| | | | |
|---|---|---|---|
| 4,041,591 | 8/1977 | Noll et al. | 55/523 |
| 4,041,592 | 8/1977 | Kelm | 55/523 |
| 4,264,346 | 4/1981 | Mann | 210/510 |
| 4,276,071 | 6/1981 | Outland | 55/DIG. 30 |
| 4,300,953 | 11/1981 | Lachman | 501/112 |

*Primary Examiner*—David L. Lacey
*Attorney, Agent, or Firm*—Stevens, Davis, Miller & Mosher

[57] ABSTRACT

The disclosed ceramic honeycomb filter comprises a ceramic honeycomb structural body having a multiplicity of parallel channels extending therethrough, selected channels being sealed at one ends thereof while the remainder of the channels being sealed at opposite ends thereof in such a manner that, as dust-containing gas flows therethrough from said one ends to said opposite ends, the gas passes through walls between adjacent channels where the dust particles are collected. The ceramic honeycomb structural body has a coefficient of thermal expansion $\alpha_A$ of 0 to $8.0 \times 10^{-6}/°C$. for 40° C. to 800° C., and the sealing material of the channels at said ends thereof has a coefficient of thermal expansion $\alpha_B$ which is in the following range for 40° C. to 800° C. The relationship of the coefficients of thermal expansion $\alpha_A$ and $\alpha_B$ are such that $|\alpha_A - \alpha_B| \leq 3.5 \times 10^{-6}/°C.$, and preferably $|\alpha_A - \alpha_B| \leq 2.5 \times 10^{-6}/°C.$

5 Claims, 9 Drawing Figures

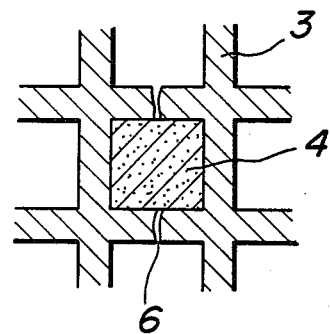
FIG._5
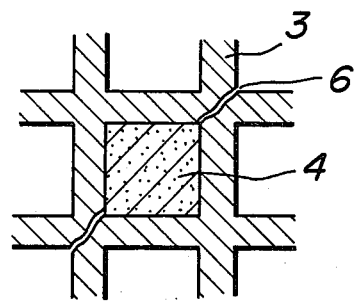
FIG._6
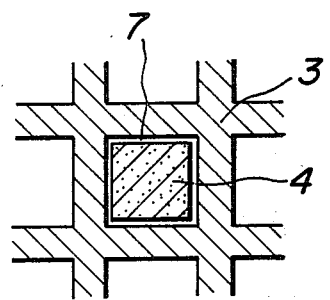
FIG._7
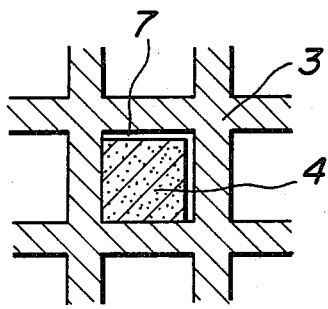
FIG._8

CERAMIC HONEYCOMB FILTER

BACKGROUND OF THE INVENTION

1. Field of the Invention

This invention relates to a ceramic honeycomb filter for removing floating fine particles from exhaust gas.

2. Description of the Prior Art

Various conventional filters have been used for removing floating particles from gas; for instance, a filter with filler such as adsorbing material or the like arranged therein, steel wool, ceramic fiber, and other porous materials. In the case of filters to remove the fine particles, means for making the filtering meshes small are used in order to increase removing efficiency thereof, but such means result in a disadvantage that the pressure loss therein becomes large when a high filtration rate is required. Moreover, the structure of the conventional filters is limited to comparatively simple ones, e.g., sheet-formed, plate-formed, or cyclindrical filter, and filters of corrugated structure, double cylindrical form, or lamination type are used in order to make their filtering areas large. However, it has been difficult to remarkably increase the filtering areas of the conventional filters.

On the other hand, a honeycomb structural body has widely been used as a support of catalyst to clean automobile exhaust gas, a heat exchanger or the like. The honeycomb structural body has noticeable advantages in that fluid pressure loss therethrough is low because a multiplicity of parallel channels of certain configuration are uniformly disposed therein, that the surface area per unit volume thereof is large, and that partition walls between the adjacent channels can be made thin to allow easy heat-up thereof. The actual application of the honeycomb structure, however, has been limited to heat exchangers and catalyst supports.

It has been proposed to make a ceramic honeycomb filter by sealing selected channels of a ceramic honeycomb structure at one ends thereof while sealing the remainder of the channels at the opposite ends thereof in such a manner that dust-containing gas flows therethrough from said one ends to the opposite ends. Since every channel which is open at said one end is closed at the said opposite end, the gas has to pass through the partition walls. Namely, the partition walls which are porous serve as filtering means and filter the floating fine particles from the gas flowing therethrough.

Accordingly, sealant used in the proposed ceramic honeycomb filter should tightly adhere to the partition wall, so as to prevent the dust-containing gas from passing through the ceramic honeycomb filter without being filtered at the aforementioned partition walls. In case of using the ceramic honeycomb filter at a high temperature, both the sealant and the honeycomb structural body must have high heat resistances. More particularly, it is necessary to select proper sealing material from ceramic materials which hardly form liquid phase even at a temperature for firing the ceramic honeycomb structural body. With the ceramic honeycomb filters which have been proposed heretofore, when the ceramic honeycomb structural body with the sealing material applied thereto is fired and cooled, the partition walls tend to be cracked or the applied sealing material portions tend to shrink excessively to produce gaps between the partition walls and the sealing material, which gaps tend to cause the sealant to be separated from the honeycomb structural body. In short, the ceramic honeycomb filters of the prior art have shortcomings in that the difference of shrinkages between the partition walls and the sealing material during cooling tend to cause cracks of the partition walls and separation of the sealant from the ceramic honeycomb structural body. Due to such shortcomings, the use of the ceramic honeycomb filter has been limited heretofore.

SUMMARY OF THE INVENTION

Therefore, an object of the present invention is to obviate the aforesaid shortcomings of the prior art. In studying the ceramic honeycomb filters having a multiplicity of parallel channels whose ends are selectively plugged by sealant, the inventors noted the effects of the relationship of the coefficients of thermal expansion between the ceramic honeycomb structural body and the sealant on the bondage without apparent liquid phase, at the contact portions between the partition walls and the sealant. Whereby, the inventors have found the following relationship is selecting proper sealant for the ceramic honeycomb filters. More particularly, in the ceramic honeycomb filter according to the present invention, the ceramic honeycomb structural body has a coefficient of thermal expansion $\alpha_A$ of 0 to $8.0 \times 10^{-6}/°C.$ for 40° C. to 800° C., and the sealant of the channels at said ends thereof has a coefficient of thermal expansion $\alpha_B$ which is in a range of $|\alpha_A - \alpha_B| \leq 3.5 \times 10^{-6}/°C.$ for 40° C. to 800° C.

In a preferable embodiment of the invention, the aforesaid relationship of the coefficients of thermal expansion between the ceramic honeycomb structural body and the sealant is in a range of $|\alpha_A - \alpha_B| \leq 2.5 \times 10^{-6}/°C.$ for 40° C. to 800° C.

Methods for producing ceramic honeycomb structural bodies include various processes, for example a paper dipping process wherein an organic porous sheet is impregnated with a ceramic slurry and a honeycomb structural body is formed and the formed body is fired, a pipe binding process wherein a large number of given shaped pipes are bound, an extrusion process wherein a batch raw material is extruded through a die provided with a large number of given shaped slits and a press process. Explaining the production of ceramic honeycomb structural bodies by extrusion in more detail, fine powders of raw material, such as alumina, silica, mullite, silicon carbide, silicon nitride, cordierite or the like are blended with an organic binder and a plasticizer. The mixture consists mainly of ceramic raw material and is kneaded and then extruded through a die having a large number of slits capable of forming channels of a given shape in the monolith structure to be extruded, for example a polygon such as a triangle, tetragon, hexagon and the like, circle, oval and so forth. The extruded structure, so shaped, is dried and fired to obtain a porous ceramic honeycomb structural body.

The ceramic honeycomb structural body thus produced has a thin wall thickness, so that the surface area per unit volume of the ceramic honeycomb structural body is remarkably large. Thus, the ceramic honeycomb structural body has a multiplicity of paralled channels extending therethrough with partition walls consisting of porous material. When certain channels of a ceramic honeycomb structural body are sealed at one ends thereof and the remaining channels thereof are sealed at the opposite ends, a ceramic honeycomb filter is formed, which filter uses the partition walls of the channels for filtering. Whereby, a very large effective filtering area per unit volume is achieved. As a result, it is made possible to make the ceramic filter small in size and to minimize the pressure loss in the filter.

BRIEF DESCRIPTION OF THE DRAWINGS

For a better understanding of the invention, reference is taken to the accompanying drawings, in which:

FIGS. 5 to 8 are schematic illustrations of possible defects whicy may be caused in the vicinity of the sealed portion of the channel.

Figure 1:
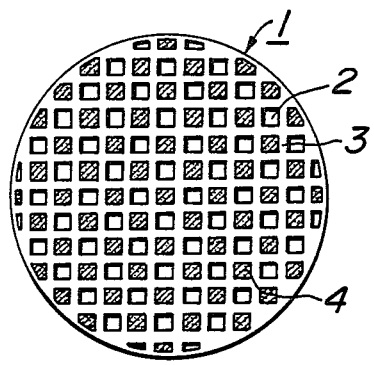
FIG. 1 is a front view showing one embodiment of a ceramic honeycomb filter according to the present invention.

Throughout the different views of the drawings, the numeral 1 is a ceramic honeycomb structural body, the numeral 2 is a channel, the numeral 3 is a partition wall between adjacent channels, the numeral 4 is a plug made of sealant, the numeral 5 is a pore, the numeral 6 is a crack, and the numeral 7 is a gap.

DESCRIPTION OF THE PREFERRED EMBODIMENTS

Figure 2:
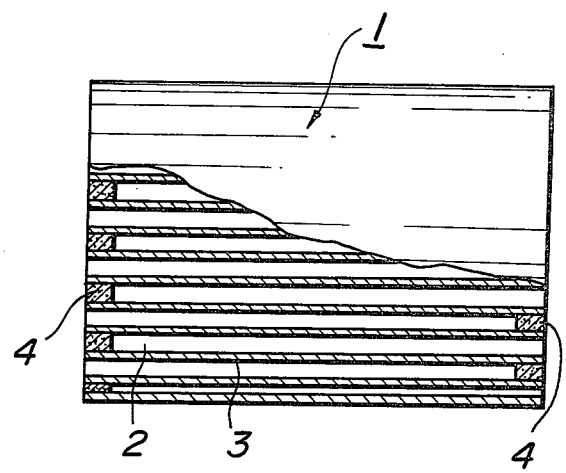
FIG. 2 is a side view of FIG. 1, with a part thereof cut away.
Figure 3:
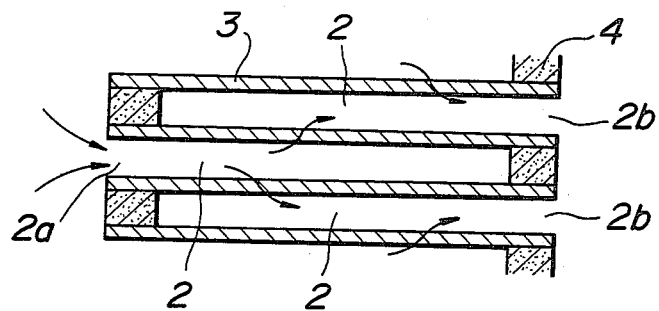
FIG. 3 is an enlarged schematic view of adjacent channels in the filter according to the invention.

Referring to FIG. 1 through FIG. 3, the ceramic honeycomb filter according to the present invention uses a ceramic honeycomb structural body 1 having a multiplicity of parallel channels 2 extending therethrough defined by porous partition walls 3 and uniformly disposed therein. A part of the channels, for instance, one half of the entire channels, are sealed at one ends thereof by plugs 4 made of sealant, while the remainder of the channels are sealed at the opposite ends thereof by similar plugs 4. In the example of FIG. 2 and FIG. 3, about one half of the channels are sealed at the left-hand ends thereof by the plugs 4, and the remaining half of the channels are sealed at the right-hand ends thereof by the plugs 4. When the left-hand end of the ceramic honeycomb structural body is disposed on the inlet of dust-containing gas with the channels extending along the flowing direction of the gas, the gas enters into the channels having openings 2a at the left-hand ends thereof. The right-hand ends of the channels with the aforementioned left-hand end openings 2a are closed by the plugs 4, so that the gas passes through the partition walls 3 between adjacent channels, so that the gas leaves the filter at the right-hand end openings 2b of the adjacent channels. Thus, the partition walls 3 act as filtering members to collect floating dust particles from the gas flowing therethrough.

Accordingly, the sealant forming the plug 4 must tightly adhere to the partition walls 3, so as to prevent the dust-containing gas from leaving the ceramic honeycomb structural body 1 without passing through the partition walls 3 acting as the filtering members. When the ceramic honeycomb filter is used at a high temperature, both the honeycomb structural body and the sealing material forming the plugs should have high heat resistances. To this end, the sealing material with a high heat resistance should preferably be selected from suitable ceramic materials which resist melting at such a high temperature as that for firing the ceramic honeycomb structural body.

Figure 4:
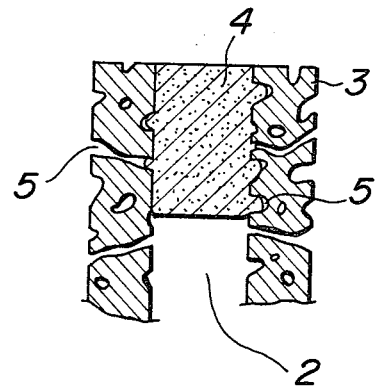
FIG. 4 is an enlarged cross-sectional view of a sealed portion of a channel, showing the conditions in which sealing material adheres to the wall of the channel.

The sealing material having the aforementioned high heat resistance adheres to the wall of the channels not mainly by melting reactions but by a combined mechanism of physical fitting of the sealing materal into the channel 2 and the physical fitting of the sealant into pores 5 on the porous partition walls 3, as shown in FIG. 4. When the ceramic honeycomb structural body 1 with plugs 4 are fired and then cooled, the ceramic honeycomb structural body of the prior art experienced cracks 6 generated on the partition walls 3, as shown in FIGS. 5 and 6, or gaps 7 generated between the partition walls 3 and the plugs 4 made of the sealing material, as shown in FIGS. 7 and 8. The cracks 6 and the gaps 7 are due to unequal shrinkage between the partition walls and the plugs. The cracks 6 and the gaps 7 cause the plugs 4 to be separated from the ceramic honeycomb structural body 1, which separation deteriorates the filtering effects to a great extent.

The present invention eliminates the risk of the aforementioned cracks 6 and the gaps 7 in the ceramic honeycomb filter, by selecting proper coefficients of thermal expansion for both the ceramic honeycomb structural body 1 and the sealant for the plugs 4.

Figure 9:
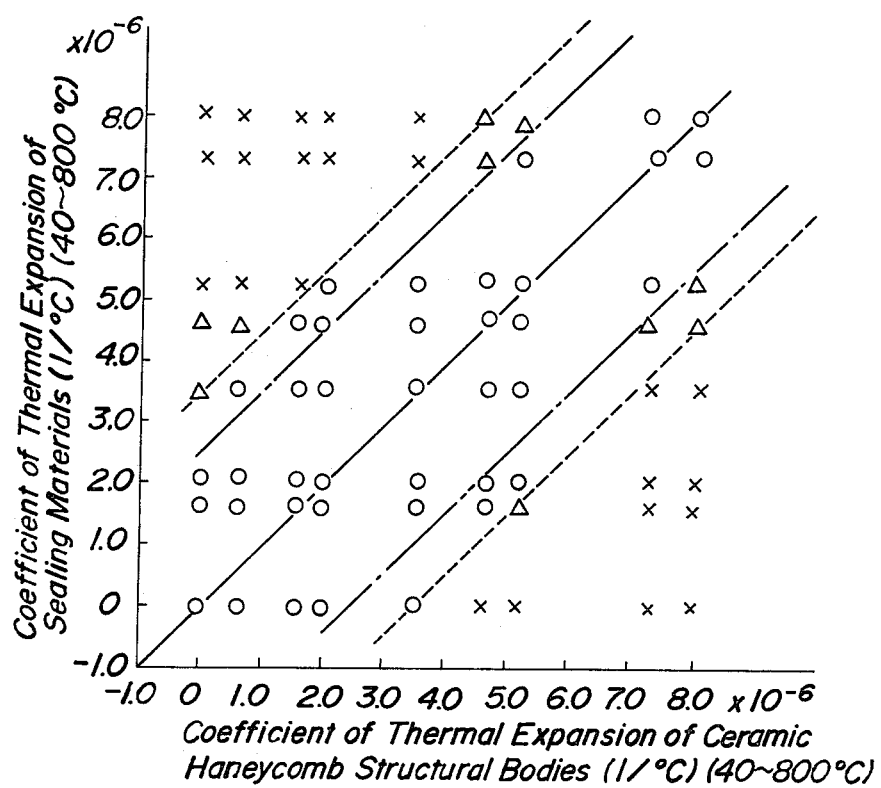
FIG. 9 is a graph showing the results of tests made on different samples of the ceramic honeycomb filter of the present invention.

The inventors have carried out a series of tests by using systematic combinations of ceramic honeycomb structural bodies consisting of various materials having gradually varying coefficients of thermal expansion in a range of 0 to $8.0 \times 10^{-6}/°C.$ for 40° C. to 800° C. and sealant consisting of ceramic material having gradually varying coefficients of thermal expansion similar to those of the aforementioned ceramic honeycomb structural bodies. After the ceramic honeycomb structural bodies were formed as ceramic honeycomb filters through the process described later in the example, the joints between the sealant in the honeycomb structural body were observed after firing. Tables 2(a)-(i) and FIG. 9 show the result of the observation. As can be seen from the tables and the figure, when coefficient of thermal expansion of the sealing material was smaller than that of the ceramic honeycomb structural body and the difference therebetween exceeded $3.5 \times 10^{-6}/°C.$, the partition walls frequently produced cracks.

On the contrary, when the coefficient of thermal expansion of the sealant was larger than that of the ceramic honeycomb structural body and the difference therebetween exceeded $3.5 \times 10^{-6}/°C.$, gaps were produced between the partition walls and the sealant, and sometimes plugs formed of the sealing material fell out from the honeycomb structural bodies. After the aforementioned observation, the performance of the thus obtained ceramic honeycomb filters was checked by heat treating at 1,200° C. for 6 hours. As a result, it was found that satisfactory combinations which were free from said defects of cracks and gaps had differences of coefficients of thermal expansion between the ceramic honeycomb structural body and the sealing material not greater than $3.5 \times 10^{-6}/°C.$, preferably not greater than $2.5 \times 10^{-6}/°C.$, in absolute values.

Once the aforesaid relationship of the coefficients of thermal expansion between the honeycomb structural body and the sealant is given, even if the firing temperature of the ceramic honeycomb structural body is varied and even if the heat-treating temperature of the ceramic honeycomb filter after sealing the sealant is varied, as long as the coefficients of thermal expansion of the ceramic materials and the firing temperatures thereof are known beforehand, it is possible to determine the propriety of a combination of these materials without actually producing a ceramic honeycomb filter from such materials. Furthermore, when the material of the sealing material is different from that of the ceramic honeycomb structural body for the reason of the workability of sealing operation, limitation on the porosity of the sealant or the like, the aforementioned range of difference of the coefficients of thermal expansion will provide an index for determining the propriety of the sealing material.

The invention will now be described in further detail by referring to the Example. The materials used in the Example were selected so as to provide the gradual variation of the coefficients of thermal expansion, and the present invention is not limited to the materials used in the Example.

EXAMPLE

Mixture of starting materials were prepared by using nine ceramic materials having different coefficients of thermal expansion as shown in Table 1. A monolithic honeycomb body was made from each of the mixtures by extrusion, and the extruded honeycomb body was dried and fired at 1,400° C. for 6 hours to produce a ceramic honeycomb structural body for forming a ceramic honeycomb filter. The ceramic honeycomb structural body after firing was 120 mm in diameter and 150 mm in length, and the partition wall between adjacent channels thereof was 0.30 mm in thickness. Each ceramic honeycomb body thus produced had about 200 channels per square inch of its cross section.

TABLE 1

| Ceramic material | Coefficient of thermal expansion $\times 10^{-6}$ (1/°C.) (40-800° C.) |
| --- | --- |
| Zirconia spinel ($ZrO_2$—$MgO.Al_2O_3$) | 8.0 |
| Clay bond silicon carbide (SiC) | 7.3 |
| Mullite-zircon ($3Al_2O_3.2SiO_2$—$ZrO_2.SiO_2$) | 5.2 |
| Mullite ($3Al_2O_3.2SiO_2$) | 4.7 |
| Zircon ($ZrO_2.SiO_2$) | 3.5 |
| Cordierite-mullite ($2MgO.2Al_2O_3.5SiO_2$—$3Al_2O_3.2SiO_2$) | 2.0 |
| Non-oriented cordierite ($2MgO.2Al_2O_3.5SiO_2$) | 1.6 |
| Oriented cordierite ($2MgO.2Al_2O_3.5SiO_2$) | 0.7 |
| Mullite aluminum titanate ($3Al_2O_3.2SiO_2$—$Al_2O_3.TiO_2$) | 0.0 |

In Table 1, the non-orientated cordierite was prepared by extending and firing the powder of fired cordierite ceramics once fired, while the oriented cordierite was prepared by extruding and firing the powder of raw materials to produce cordierite upon firing. The difference of the coefficients of thermal expansion between the oriented and non-oriented cordierites was due to the presence or absence of orientation of the cordierite crystals in the ceramic honeycomb structural body.

Separately, eight kinds of ceramic materials shown in Table 1, excluding the oriented cordierite, were dried and ground so as to obtain powder with a grain size of less than 149 μm (100 mesh). Paste-like sealant were formed by adding polyvinyl alcohol and water as a bonding agent to the ceramic material powder thus obtained.

On the other hand, a sheet of paper was adhered to one end surface of the ceramic honeycomb structural body where the channels thereof opened, and a plurality of holes were bored on the paper by a needle at the positions of selected channels to be sealed, so as to form a checker-flag pattern on the paper in the case of the illustrated embodiment. The aforesaid paste-like sealing material was charged into the holes at the bored portions of the paper and dried. Those channels which had not been closed by the paste-like sealing material were closed at the opposite end surface of the ceramic honeycomb structural body. The sealed structural body was then fired at 1,400° C. The paper was burnt up during the firing and a desired ceramic honeycomb filter was obtained. To check all the combinations of the ceramic honeycomb structural bodies and the sealant of the Example, 72 different samples of the ceramic honeycomb filter were formed.

As to the samples taken out of furnaces after the firing, the conditions of the sealed portions of the channels were chekced by observation. Sound samples, which had no cracks in the partition walls and no gaps between the partition walls and the plugs formed of the sealing material, were further heat treated at 1,200° C. for 6 hours, and the conditions of the sealed portions were again checked by observation.

Tables 2(a)-(i) and FIG. 9 show the result of such observations. In FIG. 9, the cross mark x shows presence of defects after the firing for sealing, the triangular mark Δ shows presence of defects after the heat treatment at 1,200° C. despite being sound after the firing for sealing, and the circular mark o shows absence of any defects after both the firing at 1,400° C. and heating at 1,200° C.

These marks o, Δ and x in FIG. 9 correspond to symbols "A", "B" and "C" in Tables 2(a) to 2(i) respectively.

It was concluded from the result of the observations that, when the coefficient of thermal expansion of the ceramic honeycomb structural body at 40° C. to 800° C. was in the range of 0 to $8.0 \times 10^{-6}$/°C. and the difference of the coefficients of thermal expansion between the ceramic honeycomb structural body and the sealant for 40° C. to 800° C. was in the range of $3.5 \times 10^{-6}$/°C. in absolute value, more preferably $2.5 \times 10^{-6}$/°C. in absolute value, then sound ceramic honeycomb filters were obtained.

TABLE 2

Result of Tests on Different Combinations of Ceramic Honeycomb Structural Bodies and Sealing Materials

| Ceramic honeycomb structural body | Sealing Material | Difference of coefficients of thermal expansion $\alpha_A - \alpha_B$ ($\times 10^{-6}$/°C.) | Conditions of sealed portion after firing | Conditions of sealed portion after heat treatment | Overall evaluation |
| --- | --- | --- | --- | --- | --- |
| Zirconia-spinel | zirconia-spinel | 0 | X | X | A |
| | Clay bond silicon carbide | 0.7 | X | X | A |
| | mullite-zircon | 2.8 | X | Y | B |
| | mullite | 3.3 | X | Y | B |

TABLE 2-continued

Result of Tests on Different Combinations of Ceramic Honeycomb Structural Bodies and Sealing Materials

| Ceramic honeycomb structural body | Sealing Material | Difference of coefficients of thermal expansion $\alpha_A - \alpha_B$ ($\times 10^{-6}$/°C.) | Conditions of sealed portion after firing | Conditions of sealed portion after heat treatment | Overall evaluation |
|---|---|---|---|---|---|
| | zircon cordierite | 4.5 | Y | — | C |
| | mullite oriented | 6.0 | Y | — | C |
| | cordierite mullite- | 7.3 | Y | — | C |
| | aluminum titanate | 8.0 | Y | — | C |
| Clay bond silicon carbide | zirconia-spinel | −0.7 | X | X | A |
| | clay bond silicon carbide | 0 | X | X | A |
| | mullite-zircon | 2.1 | X | X | A |
| | mullite | 2.6 | X | Y | B |
| | zircon | 3.8 | Y | — | C |
| | Cordierite mullite | 5.3 | Y | — | C |
| | oriented cordierite | 6.6 | Y | — | C |
| | mullite-aluminum titanate | 7.3 | Y | — | C |
| Mullite-zircon | zirconia-spinel | −2.8 | X | Y | B |
| | clay bond silicon carbide | −2.1 | X | X | A |
| | mullite-zircon | 0 | X | X | A |
| | mullite | 0.5 | X | X | A |
| | zircon | 1.7 | X | X | A |
| | zircon cordierite mullite | 3.2 | X | X | A |
| | oriented cordierite | 4.5 | X | Y | B |
| | mullite-aluminum titanate | 5.2 | Y | — | C |
| Mullite | zirconia-spinel | −3.3 | X | Y | B |
| | clay bond silicon carbide | −2.6 | X | Y | B |
| | mullite-zircon | −0.5 | X | X | A |
| | mullite | 0 | X | X | A |
| | zircon | 1.2 | X | X | A |
| | zircon cordierite mullite | 2.7 | X | X | A |
| | oriented cordierite | 4.0 | X | X | A |
| | mullite-aluminum titanate | 4.7 | Y | — | C |
| Zircon | zirconia-spinel | −4.5 | Y | — | C |
| | clay bond silicon carbide | −3.8 | Y | — | C |
| | mullite-zircon | −1.7 | X | X | A |
| | mullite | −2.1 | X | X | A |
| | zircon | 0 | X | X | A |
| | zircon cordierite mullite | 1.5 | X | X | A |
| | oriented cordierite | 2.8 | X | X | A |
| | mullite-aluminum titanate | 3.5 | X | X | A |
| Cordierite mullite | zirconia-spinel | −6.0 | Y | — | C |
| | clay bond silicon carbide | −5.3 | Y | — | C |
| | mullite-zircon | −3.2 | X | X | A |
| | mullite | −2.7 | X | X | A |
| | zircon | −1.5 | X | X | A |
| | zircon cordierite mullite | 0 | X | X | A |
| | oriented cordierite | 1.3 | X | X | A |
| | mullite-aluminum titanate | 2.0 | X | X | A |
| oriented cordierite | zirconia-spinel | −7.3 | Y | — | C |
| | clay bond silicon carbide | −6.6 | Y | — | C |
| | mullite-zircon | −4.5 | Y | — | C |
| | mullite | −4.0 | X | Y | B |
| | zircon cordierite | −2.8 | X | X | A |
| | mullite | −1.3 | X | X | A |
| | oriented cordierite | 0 | X | X | A |
| | mullite-aluminum titanate | 0.7 | X | X | A |
| Non-oriented cordierite | zirconia-spinel | −6.4 | Y | — | C |
| | clay bond silicon carbide | −5.7 | Y | — | C |
| | mullite-zircon | −3.6 | Y | — | C |
| | mullite | −3.1 | X | X | A |
| | zircon cordierite | −1.9 | X | X | A |
| | mullite | −0.4 | X | X | A |
| | oriented cordierite | 0.9 | X | X | A |
| | mullite-aluminum titanate | 1.6 | X | X | A |
| Mullite-aluminum titanate | zirconia-spinel | −8.0 | Y | — | C |
| | clay bond silicon carbide | −7.3 | Y | — | C |
| | mullite-zircon | −5.2 | Y | — | C |
| | Mullite | −4.7 | X | Y | B |
| | zircon cordierite | −3.5 | X | Y | B |
| | mullite | −2.0 | X | X | A |
| | oriented cordierite | −0.7 | X | X | A |
| | mullite-aluminum | | | | |

TABLE 2-continued

Result of Tests on Different Combinations of Ceramic Honeycomb Structural Bodies and Sealing Materials

| Ceramic honeycomb structural body | Sealing Material | Difference of coefficients of thermal expansion $\alpha_A - \alpha_B$ ($\times 10^{-6}$/°C.) | Conditions of sealed portion after firing | Conditions of sealed portion after heat treatment | Overall evaluation |
|---|---|---|---|---|---|
| | titanate | 0 | X | X | A |

Symbols in the table:
$\alpha_A$: Coefficient of thermal expansion of ceramic honeycomb structural body.
$\alpha_B$: Coefficient of thermal expansion of sealing material
X: Sound after firing and after the heat treatment.
Y: Sound after firing but defective after the heat treatment, and usable under certain conditions.
C: Defective and unusable.

As apparent from the above Example, in the ceramic honeycomb filter according to the invention the sealing material tightly seals the channels and the sealing materials contains no ingredients subject to melting reaction, so that the ceramic honeycomb structural body is free from denaturing and deterioration of its heat resistance. As a result, a ceramic honeycomb filter having a high removing efficiency and a high heat resistance is provided, which filter is very effective in removing fine soot particles from high-temperature exhaust gas of Diesel engines and other internal combustion engines. In this case, carbon dust and other fine particles collected in the filtering portion can be burnt into carbon monoxide (CO), hydrocarbons ($HC_n$) or nitrogen oxides (NOx) which can be purified by a separate three way catalyst means, so that the ceramic honeycomb filter according to the invention does not require any cleaning and is continuously usable for a long period of time.

Thus, the present invention contributes greatly to development of the industry.

What is claimed is:

1. A ceramic honeycomb filter comprising a ceramic honeycomb structural body with a multiplicity of parallel channels extending therethrough, said channels being defined by a plurality of interlaced thin gas filtering porous partition walls between adjacent channels, said channels being selectively sealed by sealant in such a manner that said channels include a first group comprising inlet passages open at one end of the channels and closed at the other end, a second group comprising outlet passages closed at said one end of the channels and open at the other, wherein said inlet and outlet passages are arranged side by side such that each said inlet and outlet passages are defined by said porous partition walls so as to form a filtering surface for gas flow between said adjacent channels, said ceramic honeycomb structural body having a coefficient of thermal expansion $\alpha_A$ of 0 to $8.0 \times 10^{-6}$/°C. for 40° C. to 800° C., said sealant having a coefficient of thermal expansion $\alpha_B$ for 40° C. to 800° C. in a range satisfying a relationship of $|\alpha_A - \alpha_B| \leq 3.5 \times 10^{-6}$/°C.

2. A ceramic honeycomb filter as set forth in claim 1, wherein the coefficient of thermal expansion $\alpha_B$ of said sealant is such as to satisfy a relationship of $|\alpha_A - \alpha_B| \leq 2.5 \times 10^{-6}$/°C.

3. A ceramic honeycomb filter as set forth in one of claim 1 or 2, wherein said ceramic honeycomb structural body is made of cordierite ceramic material, and said sealant consists of at least one ceramic material selected from the group consisting of cordierite ceramic material and mullite ceramic material.

4. A ceramic honeycomb filter as set forth in one of claim 1 or 2, wherein said ceramic honeycomb structural body is made of mullite ceramic material, and said sealant consists of at least one ceramic material selected from the group consisting of cordierite ceramic material and mullite ceramic material.

5. A ceramic honeycomb filter comprising a ceramic honeycomb structural body with a multiplicity of parallel channels extending therethrough said channels being selectively sealed by sealant to form a checker-flag pattern, said ceramic honeycomb structural body having a coefficient of thermal expansion $\alpha_A$ of 0 to $8.0 \times 10^{-6}$/°C. for 40° C. to 800° C., said sealant having a coefficient of thermal expansion $\alpha_B$ for 40° C. to 800° C. in a range satisfying a relationship of $|\alpha_A - \alpha_B| \leq 3.5 \times 10^{-6}$/°C.

* * * * *